United States Patent
Zhang et al.

(10) Patent No.: US 12,238,352 B2
(45) Date of Patent: Feb. 25, 2025

(54) STUDIO CONTROL ROOM, BROADCAST MAJOR STRUCTURE, BROADCAST CONTROL SYSTEM, DEVICE AND METHOD, AND STORAGE MEDIUM

(71) Applicant: BOE TECHNOLOGY GROUP CO., LTD., Beijing (CN)

(72) Inventors: Yifei Zhang, Beijing (CN); Enhui Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/024,993

(22) PCT Filed: Jan. 30, 2022

(86) PCT No.: PCT/CN2022/075184
§ 371 (c)(1),
(2) Date: Mar. 7, 2023

(87) PCT Pub. No.: WO2023/142113
PCT Pub. Date: Aug. 3, 2023

(65) Prior Publication Data
US 2024/0283990 A1 Aug. 22, 2024

(51) Int. Cl.
*H04N 21/238* (2011.01)
*H04N 21/262* (2011.01)
(Continued)

(52) U.S. Cl.
CPC ..... *H04N 21/238* (2013.01); *H04N 21/26208* (2013.01); *H04N 21/414* (2013.01); *H04N 21/4622* (2013.01); *H04N 21/6332* (2013.01)

(58) Field of Classification Search
CPC ........... H04N 21/238; H04N 21/26208; H04N 21/414; H04N 21/4622; H04N 21/6332
See application file for complete search history.

(56) References Cited

U.S. PATENT DOCUMENTS 9,391,698 B1 * 7/2016 Urata ..................... H04B 10/40
2010/0162326 A1 6/2010 Bonar
(Continued)

FOREIGN PATENT DOCUMENTS

| CN | 101923843 A | 12/2010 |
| CN | 102833468 A | 12/2012 |

(Continued)

OTHER PUBLICATIONS

Jiang et al., "Analysis and prospect of control system for stage lighting," Conference paper, 3rd International Congress on Image and Signal Processing, 2010, Inst. Electrical Electronics Engineers.
(Continued)

*Primary Examiner* — Jefferey F Harold
*Assistant Examiner* — Alexander Boyd
(74) *Attorney, Agent, or Firm* — HOUTTEMAN LAW LLC

(57) ABSTRACT

A studio control room including a first master control device, a master transmission route and a standby transmission route are provided. The first master control device is configured to transmit an audio/video broadcast control signal to a broadcast major structure through the master transmission route and the standby transmission route. The embodiment of the present disclosure further provides a broadcast major structure including a master broadcast control route and a standby broadcast control route. The master broadcast control route and the standby broadcast control route each are configured to receive the audio/video broadcast control signal sent by the studio control room and play the audio/video file according to the audio/video broadcast control signal. The embodiment of the present disclosure provides a broadcast control system including above studio control room and broadcast major structure. The studio control room is coupled to the broadcast major structure.

16 Claims, 5 Drawing Sheets

(51) Int. Cl.
    *H04N 21/414*     (2011.01)
    *H04N 21/462*     (2011.01)
    *H04N 21/6332*     (2011.01)

(56) References Cited

U.S. PATENT DOCUMENTS

2012/0226920 A1\*   9/2012   Strumpf .............. G06F 11/1443
    710/305
2012/0236160 A1    9/2012   Rezek et al.

FOREIGN PATENT DOCUMENTS

| | | | |
|---|---|---|---|
| CN | 103281480 A | | 9/2013 |
| CN | 104167178 A | | 11/2014 |
| CN | 109412886 B | | 5/2020 |
| CN | 111432259 A | | 7/2020 |
| CN | 112600747 A | \* | 4/2021 |
| JP | 2009017508 A | | 1/2009 |
| JP | 2021002756 A | \* | 1/2021 |

OTHER PUBLICATIONS

Fan, "Research on Redundancy Technology of LED Display Control System Based on Gigabit Ethernet," Master's Thesis, 2009, Xidian Univ., Xi'an, China.

Wang et al., "Design and realization of screen broadcast control system based on multi-level backup," Media Technology, 2020, vol. 11, pp. 125-128. DOI: 10.19483/j.cnki.11-4653/n.2020.11.038.

\* cited by examiner

STUDIO CONTROL ROOM, BROADCAST MAJOR STRUCTURE, BROADCAST CONTROL SYSTEM, DEVICE AND METHOD, AND STORAGE MEDIUM

TECHNICAL FIELD

The embodiments of the present disclosure relate to the technical field of display, and in particular to a studio control room, a broadcast major structure, a broadcast control system, a broadcast control method, a broadcast control device and a readable storage medium.

BACKGROUND

The broadcast control system with strong reusability and robustness is particularly suitable for the overall arrangement scheme of large-scale evening parties and performances.

SUMMARY

Embodiments of the present disclosure provide a studio control room, a broadcast major structure, a broadcast control system, a broadcast control method, a broadcast control device, and a readable storage medium.

As a first aspect, an embodiment of the present disclosure provides a studio control room including a first master control device, a master transmission route and a standby transmission route. The first master control device is configured to transmit an audio/video broadcast control signal to a broadcast major structure via the master transmission route and the standby transmission route, respectively.

In some embodiments, the master transmission route includes a first serial server, a first network transmission circuit, and a first optical fiber transmission box. The first master control device, the first serial server, the first network transmission circuit, and the first optical fiber transmission box are sequentially coupled in series. The first serial server is configured to convert the audio/video broadcast control signal in form of RS485/RS232 into the audio/video broadcast control signal in form of TCP/IP protocol text. The first network transmission circuit is configured to transmit the audio/video broadcast control signal in form of TCP/IP protocol text to the first optical fiber transmission box. The first optical fiber transmission box is configured to transmit the audio/video broadcast control signal in form of TCP/IP protocol text to the broadcast major structure.

In some embodiments, the standby transmission route includes a second serial server, a second network transmission circuit, and a second optical fiber transmission box. The first master control device, the second serial server, the second network transmission circuit and the second optical fiber transmission box are sequentially coupled in series. The second serial server is configured to convert the audio/video broadcast control signal in form of RS485/RS232 into the audio/video broadcast control signal in form of TCP/IP protocol text. The second network transmission circuit is configured to transmit the audio/video broadcast control signal in form of TCP/IP protocol text to the second optical fiber transmission box. The second optical fiber transmission box is configured to transmit the audio/video broadcast control signal in form of TCP/IP protocol text to the broadcast major structure.

In some embodiments, the first master control device is coupled to the first serial server via a twisted pair cable, and the first master control device is coupled to the second serial server via a twisted pair cable. The first serial server and the first optical fiber transmission box are respectively coupled to the first network transmission circuit via network cables, and the second serial server and the second optical fiber transmission box are respectively coupled to the second network transmission circuit through network cables.

As a second aspect, an embodiment of the present disclosure provides a broadcast major structure including a master broadcast control route and a standby broadcast control route. Each of the master broadcast control route and the standby broadcast control route is configured to receive the audio/video broadcast control signal sent from the studio control room and play an audio/video file according to the audio/video broadcast control signal.

In some embodiments, the master broadcast control route includes a first optical fiber receiving box, a third network transmission circuit, and a master broadcast control structure sequentially coupled in series. The first optical fiber receiving box is coupled to the studio control room and configured to receive the audio/video broadcast control signal and sequentially transmit the audio/video broadcast control signal to the third network transmission circuit and the master broadcast control structure. The master broadcast control structure is configured to play the audio/video file under the control of the audio/video broadcast control signal.

In some embodiments, the standby broadcast control route includes a second optical fiber receiving box, a fourth network transmission circuit, and a standby broadcast control structure sequentially coupled in series. The second optical fiber receiving box is coupled to the studio control room and configured to receive the audio/video broadcast control signal and sequentially transmit the audio/video broadcast control signal to the fourth network transmission circuit and the standby broadcast control structure. The standby broadcast control structure is configured to play the audio/video file under the control of the audio/video broadcast control signal.

In some embodiments, the master broadcast control structure includes a master broadcast controller, a third serial server, an audio/video switcher, a master transmission box and a stage art structure. The third serial server is coupled to the third network transmission circuit and the audio/video switcher respectively, and is configured to convert a signal in form of TCP/IP protocol text output from the third network transmission circuit into an RS485/RS232 signal and provide the RS485/RS232 signal to the audio/video switcher. The signal in form of TCP/IP protocol text output from the third network transmission circuit includes the audio/video broadcast control signal. The master broadcast controller, the audio/video switcher, the master transmission box and the stage art structure are sequentially coupled in series. The master broadcast controller is coupled to the third network transmission circuit and is configured to store and provide the audio/video file. The stage art structure is configured to play the audio/video file provided by the master broadcast controller.

In some embodiments, the standby broadcast control structure includes a standby broadcast controller, the audio/video switcher, a standby transmission box and the stage art structure. The standby broadcast controller, the audio/video switcher, the standby transmission box and the stage art structure are sequentially coupled in series. The standby broadcast controller is coupled to the fourth network transmission circuit and configured to store and provide the audio/video file. The stage art structure is further configured to play the audio/video file provided by the standby broadcast controller. The audio/video switcher is configured to switch to one of the master broadcast controller and the standby broadcast controller in response to the other one of the master broadcast controller and the standby broadcast controller fails, such that the one of the master broadcast controller and the standby broadcast controller provides the audio/video file.

In some embodiments, the standby broadcast control structure further includes a fourth serial server. The fourth serial server is respectively coupled to the fourth network transmission circuit and the standby transmission box, and is configured to convert a signal in form of TCP/IP protocol text output by the fourth network transmission circuit into an RS485/RS232 signal and provide the RS485/RS232 signal to the standby transmission box. The signal in form of TCP/IP protocol text output by the fourth network transmission circuit includes a restart control signal for controlling the standby transmission box to restart.

In some embodiments, the third network transmission circuit is coupled to the fourth network transmission circuit, such that anyone of a backend of the master broadcast controller and a backend of the standby broadcast controller monitors whether the other one of the master broadcast controller and the backend of the standby broadcast controller is in a normal operation state or not. The signal in form of TCP/IP protocol text output to the third serial server from the third network transmission circuit further includes an audio/video switching control signal based on which the audio/video switcher switches the audio/video file played by the master broadcast controller and the audio/video file played by the audio or video of the standby broadcast controller.

In some embodiments, the stage art structure includes n master receiving boxes, n standby receiving boxes and a display screen, wherein n is an integer greater than 1. The n master receiving boxes are sequentially coupled in series, and a first master receiving box of the n master receiving boxes is coupled to the master transmission box. The n standby receiving boxes are sequentially coupled in series, and a first standby receiving box of the n standby receiving boxes is coupled to the standby transmission box. An $i^{th}$ master receiving box is coupled to an $i^{th}$ standby receiving box, the $i^{th}$ master receiving box is coupled to an $(i+1)^{th}$ standby receiving box, and an $i^{th}$ standby receiving box is coupled to an $(i+1)^{th}$ master receiving box, wherein i=1, 2, 3 . . . n, and i is an integer. The n master receiving boxes and the n standby receiving boxes are respectively coupled to the display screen, and the display screen has n display regions. The $i^{th}$ master receiving box and the $i^{th}$ standby receiving box are configured to control an $i^{th}$ display region of the n display regions of the display screen to display.

In some embodiments, the broadcast major structure further includes a second master control device, a first wireless network transmission circuit, a second wireless network transmission circuit, a fifth serial server and a sixth serial server. The first wireless network transmission circuit is coupled to the fifth serial server, and the fifth serial server is coupled to the third network transmission circuit. The second wireless network transmission circuit is coupled to the sixth serial server, and the sixth serial server is coupled to the fourth network transmission circuit. The second master control device is configured to transmit a wireless audio/video broadcast control signal. The first wireless network transmission circuit and the second wireless network transmission circuit are configured to receive the wireless audio/video broadcast control signal respectively, and transmit the wireless audio/video broadcast control signal to the fifth serial server and the sixth serial server respectively. The fifth serial server is configured to convert the audio/video broadcast control signal in form of RS485/RS232 into the audio/video broadcast control signal in form of TCP/IP protocol text, and the sixth serial server is configured to convert the audio/video broadcast control signal in form of RS485/RS232 into the audio/video broadcast control signal in form of TCP/IP protocol text.

As a third aspect, an embodiment of the present disclosure provides a broadcast control system including above studio control room and above broadcast major structure. The studio control room is coupled to the broadcast major structure.

In some embodiments, the first optical fiber receiving box in the broadcast major structure is coupled to the first optical fiber transmission box in the studio control room via an optical fiber cable, and the first optical fiber receiving box is coupled to the third network transmission circuit in the broadcast major structure via a network cable. The second optical fiber receiving box in the broadcast major structure is coupled to the second optical fiber transmission box in the studio control room via an optical fiber cable, and the second optical fiber receiving box is coupled to the fourth network transmission circuit in the broadcast major structure via a network cable.

In some embodiments, each of the first network transmission circuit, second network transmission circuit, the third network transmission circuit, and the fourth network transmission circuit in the studio control room employs a switcher or a router, and each of the first wireless network transmission circuit and the second wireless network transmission circuit in the broadcast major structure employs a switcher or a router.

As a fourth aspect, an embodiment of the present disclosure provides a broadcast control method, including: providing a first master control device, a master transmission route and a standby transmission route for a studio control room; and providing a master broadcast control route and a standby broadcast control route for a broadcast major structure; transmitting, by the first master control device, an audio/video broadcast control signal to the broadcast major structure via both of the master transmission route and the standby transmission route; and receiving, by the master broadcast control route, the audio/video broadcast control signal sent by the master transmission route and playing an audio/video file according to the audio/video broadcast control signal; meanwhile, receiving, by the standby broadcast control route, the audio/video broadcast control signal sent by the transmission route and playing the audio/video file according to the audio/video broadcast control signal.

In some embodiments, the broadcast control method adopts above broadcast major structure, and the broadcast control method includes: monitoring, by any one of a backend of the master broadcast controller and a backend of the standby broadcast controller, whether the other one of the backend of the master broadcast controller and the backend of the standby broadcast controller is in a normal operation state; transmitting, by the backend of the standby broadcast controller, an audio/video switching control signal to the third network transmission circuit in response to that the master broadcast controller feedbacks abnormally, wherein the audio/video switching control signal is input into the audio/video switcher through a third serial server; and switching, by the audio/video switcher, to the standby broadcast controller according to the audio/video switching control signal, such that the standby broadcast controller provides the audio/video file.

In some embodiments, the broadcast control method further includes: detecting, by the backend of the master broadcast controller, whether the master transmission box has a fault through the audio/video switcher; transmitting, by the backend of the master broadcast controller, an audio/video transmission switching control signal to the third network transmission circuit in response to that the master transmission box has a fault; wherein the audio/video transmission switching control signal is input into the audio/video switcher through the third serial server; and switching, by the audio/video switcher, to the standby transmission box according to the audio/video transmission switching control signal, such that the standby transmission box transmits the audio/video file.

In some embodiments, the broadcast control method further includes: detecting, by the backend of the standby broadcast controller, whether the standby transmission box has a fault through the audio/video switcher; and transmitting, by the backend of the standby broadcast controller, a restart control signal to the fourth network transmission circuit in response to that the standby transmission box has a fail, wherein the restart control signal is transmitted to the standby transmission box through the fourth serial server to control the standby transmission box to restart.

In some embodiments, the master broadcast controller and the standby broadcast controller operate within a same IP network segment.

In some embodiments, the broadcast control method adopts above broadcast major structure, and the broadcast control method further includes: detecting at a first predetermined time interval, by the master transmission box, whether n master receiving boxes have a fault or not; detecting at the first predetermined time interval, by the standby transmission box, whether n standby receiving boxes have a fault or not; transmitting, by an $i^{th}$ standby receiving box of the n standby receiving boxes, the audio/video file in response to that an $i^{th}$ master receiving box of the n master receiving boxes has a fault.

In some embodiments, the broadcast control method adopts above broadcast major structure, and the broadcast control method further includes: transmitting, by the second master control device, a wireless audio/video broadcast control signal in response to that the master transmission route and the standby transmission route are both disconnected; and receiving, by the first wireless network transmission circuit, the wireless audio/video broadcast control signal and transmitting the wireless audio/video broadcast control signal to the master broadcast control route through the fifth serial server; meanwhile, receiving, by the second wireless network transmission circuit, the wireless audio/video broadcast control signal and transmitting the wireless audio/video broadcast control signal to the standby broadcast control route through the sixth serial server.

In some embodiments, the broadcast control method further includes: determining, by the first master control device, whether a feedback signal returned by the master broadcast control route and/or the standby broadcast control route is received during second predetermined time, after the first master control device transmits the audio/video broadcast control signal to the broadcast major structure; finishing a task of the first master control device in response to that the first master control device receives the feedback signal returned by the master broadcast control route and/or the standby broadcast control route during the second predetermined time; or transmitting, by the first master control device, the audio/video broadcast control signal again in response to that the first master control device does not receive the feedback signal returned by the master broadcast control route and/or the standby broadcast control route during the second predetermined time.

In some embodiments, the broadcast control method further includes: playing the audio/video file according to the audio/video broadcast control signal received for the first time in response to that the master broadcast control route and the standby broadcast control route receive the audio/video broadcast control signal for multiple times during third predetermined time.

In some embodiments, the broadcast control method further includes: determining, by the second master control device, whether a feedback signal returned by the master broadcast control route and/or the standby broadcast control route is received during second predetermined time, after the second master control device transmits the audio/video broadcast control signal to the broadcast major structure; finishing a task of the second master control device, in response to that the second master control device receives the feedback signal returned by the master broadcast control route and/or the standby broadcast control route during the second predetermined time; or transmitting, by the second master control device, the audio/video broadcast control signal again, in response to that the second master control device does not receive the feedback signal returned by the master broadcast control route and/or the standby broadcast control route during the second predetermined time.

As a fifth aspect, an embodiment of the present disclosure provides a broadcast control device including above broadcast control system.

As a sixth aspect, an embodiment of the present disclosure provides a non-transitory computer-readable storage medium storing instructions which, when executed by a processor, cause the processor to perform above broadcast control method.

BRIEF DESCRIPTION OF DRAWINGS

The accompanying drawings, which constitute a part of the specification, provide a further understanding of the embodiments of the present disclosure, illustrate the present disclosure together with the embodiments of the present disclosure, and do not constitute a limitation on the present disclosure. The above and other features and advantages will become more apparent to those skilled in the art by illustrating the detailed example embodiments with reference to the accompanying drawings, in which.

DETAIL DESCRIPTION OF EMBODIMENTS

Figure 1:
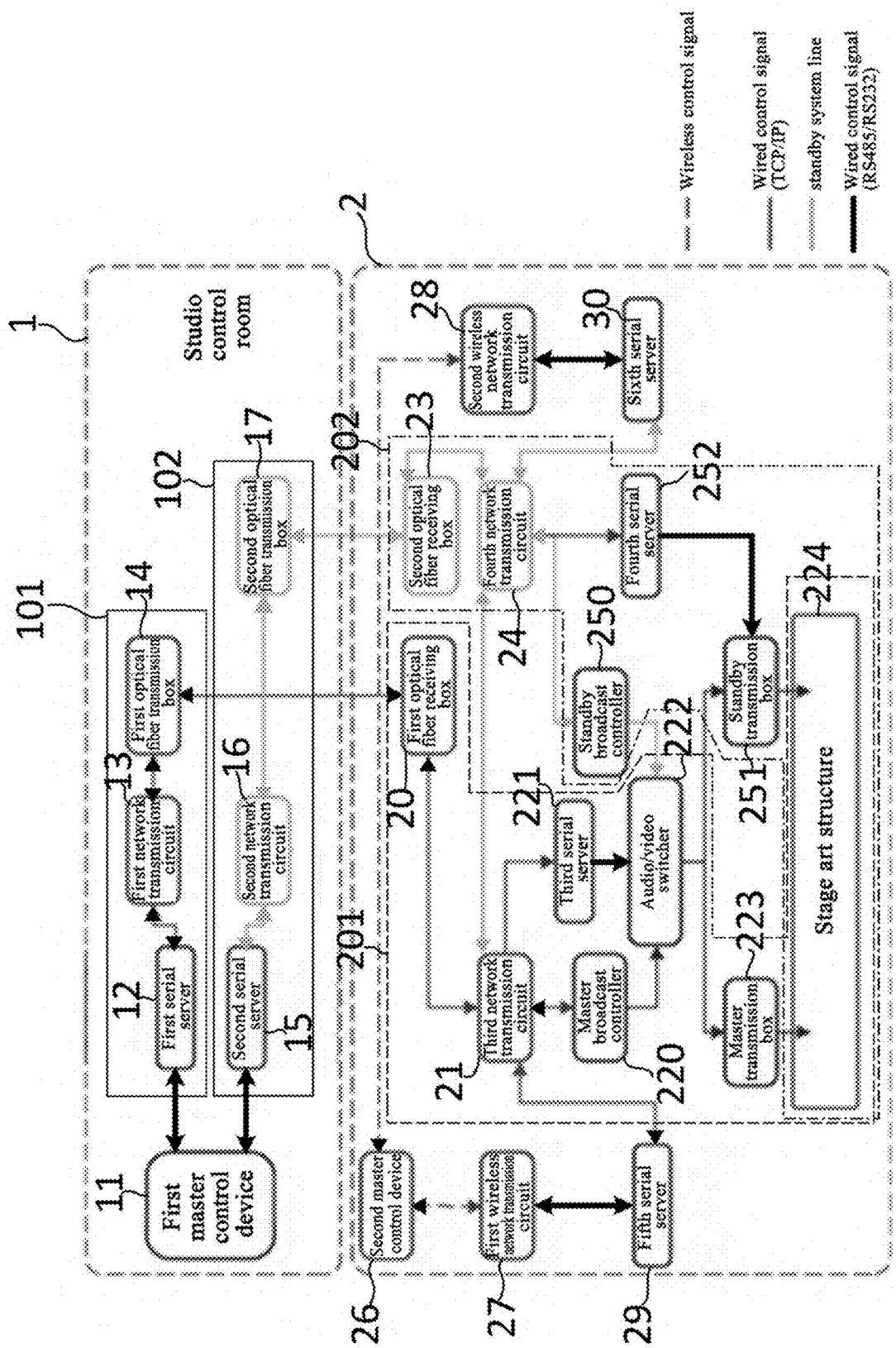
FIG. 1 is an architecture diagram of a broadcast control system in an embodiment of the present disclosure.

In order to enable those skilled in the art to better understand the technical solution of the embodiments of the present disclosure, a studio control room, a broadcast major structure, a broadcast control system and a broadcast control method, a broadcast control device, and a readable storage medium provided by the embodiments of the present disclosure will be further described in detail in combination with the accompanying drawings and specific embodiments.

The embodiments of the present disclosure will be described more fully hereinafter with reference to the accompanying drawings, but the embodiments shown may be embodied in different forms and should not be construed as limited to the embodiments of the present disclosure. Rather, these embodiments are provided so that the present disclosure will be thorough and complete, and will fully convey the scope of the present disclosure to those skilled in the art.

The present disclosures are not limited to the embodiments shown in the drawings, but include modifications of configurations formed based on a manufacturing process. Therefore, the regions in the drawings are schematic regions, and the regions shown in the drawings have specific shapes, but are not limited to the present disclosure.

In the following, the terms "first", "second" are used for descriptive purposes only and are not to be understood as indicating or implying relative importance or implicitly indicating the number of technical features indicated. Thus, the feature defined by "first" or "second" may explicitly or implicitly include one or more of that feature. In the description of the embodiments of the present disclosure, "multiple times" means two or more times, unless otherwise specified.

In describing some embodiments, expressions of "couple" and its derivatives may be used. For example, the term "couple" may indicate that two or more components are physical or electrical coupled to each other in some embodiments. The embodiments disclosed herein are not necessarily limited to the content herein.

The use of "configured to" herein means an open and inclusive language that does not preclude being configured with a device to perform additional tasks or steps.

In the related technology, a studio control room and a broadcast major structure are in the same broadcast control system, and the studio control room and the broadcast major structure are not separated by a network, so that the broadcast control system has poor reusability and robustness, and cannot be applied to the overall arrangement scheme of large-scale evening parties and performances.

Based on the above problem, as a first aspect, an embodiment of the present disclosure provides a studio control room including a first master control device, a master transmission route, and a standby transmission route. The first master control device may transmit an audio/video (i.e., audio and/or video) broadcast control signal to the broadcast major structure through the master transmission route and the standby transmission route.

As a second aspect, an embodiment of the present disclosure provides a broadcast major structure including a master broadcast control route and a standby broadcast control route. The master broadcast control route and the standby broadcast control route may each receive the audio/video broadcast control signal sent by the studio control room, and play an audio/video (i.e., audio and/or video) according to the audio/video broadcast control signal.

As a third aspect, an embodiment of the present disclosure provides a broadcast control system. FIG. 1 is an architecture diagram of the broadcast control system in an embodiment of the present disclosure. The broadcast control system includes the studio control room 1 and the broadcast major structure 2 in the foregoing embodiments. The studio control room 1 is coupled to the broadcast major structure 2. The studio control room 1 includes a first master control device 11, a master transmission route 101 and a standby transmission route 102. The first master control device 11 is configured to transmit an audio/video broadcast control signal to the broadcast major structure 2 through the master transmission route 101 and the standby transmission route 102. The broadcast major structure 2 includes a master broadcast control route 201 and a standby broadcast control route 202. The master broadcast control route 201 is configured to receive an audio/video broadcast control signal sent by the master transmission route 101 and play an audio or video file (i.e., an audio/video file) according to the audio/video broadcast control signal. The standby broadcast control route 202 is configured to receive an audio/video broadcast control signal sent from the transmission route 102 and play an audio/video file according to the audio/video broadcast control signal.

The space positions of the studio control room 1 and the broadcast major structure 2 are different. For example, the studio control room 1 may be any studio control terminal, and the studio control room 1 may be located at any position where the studio control terminal is located. The broadcast major structure 2 may be any controlled broadcast terminal, and the broadcast major structure 2 may be located at a position where the controlled broadcast terminal is located. The configurations of the master transmission route 101 and the standby transmission route 102 realize a master-standby backup scheme of the studio control room 1, that is, the audio/video broadcast control signal is transmitted to the broadcast major structure 2 through two independent circuits, so that the effective transmission of the audio/video broadcast control signal can be ensured, and the robustness of the broadcast control system can be further ensured. The studio control room 1 only needs to transmit an audio/video broadcast control signal, so that the hardware requirement on the studio control room 1 can be reduced, and the applicability of the studio control room 1 is wider.

In some embodiments, the first master control device 11 may be any terminal capable of transmitting an audio/video broadcast control signal, such as a tablet computer, a PC, or the like.

In some embodiments, the master transmission route 101 includes a first serial server 12, a first network transmission circuit 13, and a first optical fiber transmission box 14. The first master control device 11, the first serial server 12, the first network transmission circuit 13 and the first optical fiber transmission box 14 are sequentially coupled in series. The first serial server 12 may convert an audio/video broadcast control signal in form of RS485/RS232 into an audio/video broadcast control signal in form of TCP/IP protocol text. The first network transmission circuit 13 may transmit the audio/video broadcast control signal in form of TCP/IP protocol text to the first optical fiber transmission box 14. The first optical fiber transmission box 14 may transmit the audio/video broadcast control signal in form of TCP/IP protocol text to the broadcast major structure.

In some embodiments, the standby transmission route 102 includes a second serial server 15, a second network transmission circuit 16, and a second optical fiber transmission box 17. The first master control device 11, the second serial server 15, the second network transmission circuit 16 and the second optical fiber transmission box 17 are sequentially coupled in series. The second serial server 15 may convert an audio/video broadcast control signal from the RS485/RS232 signal into the TCP/IP protocol text. The second network transmission circuit 16 may transmit an audio/video broadcast control signal in form of TCP/IP protocol text to the second optical fiber transmission box 17. The second optical fiber transmission box 17 may transmit the audio/video broadcast control signal in form of TCP/IP protocol text to the broadcast major structure 2.

The first serial server 12 and the second serial server 15 transmits the audio/video broadcast control signal, so that not only the remote transmission of the audio/video broadcast control signal can be guaranteed, but also the separation in terms of networks between the studio control room 1 and the broadcast major structure 2 can be realized, and the possibility of the studio control room 1 being interfered by other devices and the influence of the studio control room 1 on the broadcast major structure 2 both can be reduced. The first optical fiber transmission box 14 and the second optical fiber transmission box 17 can realize the long-distance transmission of the audio/video broadcast control signal.

In some embodiments, the first master control device 11 is coupled to the first serial server 12 via a twisted pair cable. The first master control device 11 is coupled to the second serial server 15 via a twisted pair cable.

In some embodiments, the first serial server 12 and the first optical fiber transmission box 14 each are coupled to the first network transmission circuit 13 via a network cable. The second serial server 15 and the second optical fiber transmission box 17 each are coupled to the second network transmission circuit 16 via a network cable.

In some embodiments, the first network transmission circuit 13 and the second network transmission circuit 16 each employ switches or routers.

In some embodiments, the master broadcast control route 201 includes a first optical fiber receiving box 20, a third network transmission circuit 21 and a master broadcast control structure sequentially coupled in series. The first optical fiber receiving box 20 is coupled to the first optical fiber transmission box 14, and is configured to receive the audio/video broadcast control signal and sequentially transmit the audio/video broadcast control signal to the third network transmission circuit 21 and the master broadcast control structure. The master broadcast control structure may play the audio/video file under the control of the audio/video broadcast control signal.

In some embodiments, the standby broadcast control route 202 includes a second optical fiber receiving box 23, a fourth network transmission circuit 24, and a standby broadcast control structure which are sequentially coupled in series. The second optical fiber receiving box 23 is coupled to the second optical fiber transmission box 17, and is configured to receive the audio/video broadcast control signal and sequentially transmit the audio/video broadcast control signal to the fourth network transmission circuit 24 and the standby broadcast control structure. The standby broadcast control structure may play the audio or the video under the control of the audio/video broadcast control signal.

With the broadcast major structure 2 including the master broadcast control structure and the standby broadcast control structure, the demand of the broadcast control system on the studio control room 1 can be reduced, and the portability of the broadcast control system can be improved.

In some embodiments, the first optical fiber receiving box 20 is coupled to the first optical fiber transmission box 14 via an optical fiber cable. The first optical fiber receiving box 20 is coupled to the third network transmission circuit 21 via a network cable. The second optical fiber receiving box 23 is coupled to the second optical fiber transmission box 17 via an optical fiber cable. The second optical fiber receiving box 23 is coupled to the fourth network transmission circuits 24 via a network cable.

Since the first optical fiber receiving box 20 is coupled to the first optical fiber transmission box 14 via an optical fiber cable and the second optical fiber receiving box 23 is coupled to the second optical fiber transmission box 17 via an optical fiber cable, the remote transmission of the audio/video broadcast control signal can be realized. The types of connectors of optical fiber cables include but are not limited to SC, LC and ST.

In some embodiments, the first optical fiber receiving box 20 and the second optical fiber receiving box 23 each are configured to convert a signal transmitted by an optical fiber cable to a signal transmitted by a network cable.

In some embodiments, the master broadcast control structure includes a master broadcast controller 220, a third serial server 221, an audio/video switcher 222, a master transmission box 223, and a stage art structure 224. The third serial server 221 is coupled to the third network transmission circuit 21 and the audio/video switcher 222. The third serial server 221 may convert the signal in form of TCP/IP protocol text output by the third network transmission circuit 21 into an RS485/RS232 signal, and provide the RS485/RS232 signal to the audio/video switcher 222. The signal in form of TCP/IP protocol text output by the third network transmission circuit 21 includes the audio/video broadcast control signal. The master broadcast controller 220, the audio/video switcher 222, the master transmission box 223 and the stage art structure 224 are sequentially coupled in series. The master broadcast controller 220 is coupled to the third network transmission circuit 21 and is configured to store and provide audio/video file. The stage art structure 224 may play the audio/video file provided by the master broadcast controller 220.

In some embodiments, the standby broadcast control structure includes a standby broadcast controller 250, an audio/video switcher 222, a standby transmission box 251, and a stage art structure 224. The standby broadcast controller 250, the audio/video switcher 222, the standby transmission box 251 and the stage art structure 224 are sequentially coupled in series. The standby broadcast controller 250 is coupled to the fourth network transmission circuit 24 and is configured to store and provide audio/video file. The stage art structure 224 may play the audio/video file provided by the standby broadcast controller 250. The audio/video switcher 222 may switch to the other one which does not fail when one of the master broadcast controller 220 and the standby broadcast controller 250 fails, so that the other one may provide audio/video file.

The stage art structure 224 may be, for example, a mini led light box, an OLED display, or an LCD display. With the master broadcast control structure 2 including the master broadcast control structure, the standby broadcast control structure and the audio/video switcher 222, when one of the master broadcast controller 220 and the standby broadcast controller 250 fails, the audio/video switcher 222 switches to the other one which does not fail, so that the other one provides audio/video file, thereby further improving the robustness of the broadcast control system.

In some embodiments, the standby broadcast control structure further includes a fourth serial server 252. The fourth serial server 252 is coupled to the fourth network transmission circuit 24 and the standby transmission box 251. The fourth serial server 252 may convert the signal in form of TCP/IP protocol text output by the fourth network transmission circuit 24 into an RS485/RS232 signal, and provide the RS485/RS232 signal to the standby transmission box 251. The signal in form of TCP/IP protocol text output by the fourth network transmission circuit 24 includes a restart control signal for controlling the standby transmission box 251 to restart.

The fourth serial server 252 is set such that the standby transmission box 251 can be restarted under the control of the restart control signal when the standby transmission box 251 crashes or has a fault, so that the standby transmission box 251 is recovered to be normal; thereby further improving the robustness of the broadcast control system.

In some embodiments, the third network transmission circuit 21 is coupled to the fourth network transmission circuit 24, so that the backend of the master broadcast controller 220 and the backend of the standby broadcast controller 250 monitor each other to determine if the other one of the master broadcast controller 220 and the standby broadcast controller 250 is in a normal operation state. The signal in form of TCP/IP protocol text output by the third network transmission circuit 21 to the third serial server 221 further includes an audio/video switching control signal. The audio/video switching control signal may control the audio/video switcher 222 to switch between the audio/video from the master broadcast controller 220 and the audio/video from the standby broadcast controller 250. The master broadcast controller 220 and the standby broadcast controller 250 monitor each other through the third network transmission circuit 21 and the fourth network transmission circuit 24, respectively, to determine if the other one of the master broadcast controller 220 and the standby broadcast controller 250 is in a normal operation state. When one of the master broadcast controller 220 and the standby broadcast controller 250 has a fault, the audio/video switching control signal controls the audio/video switcher 222 to switch to the other one of the master broadcast controller 220 and the standby broadcast controller 250, so that the other one provides audio/video file, thereby improving the robustness of the broadcast control system.

In some embodiments, the third network transmission circuit 21 and fourth network transmission circuit 24 each employ the switcher or the router.

Figure 2:
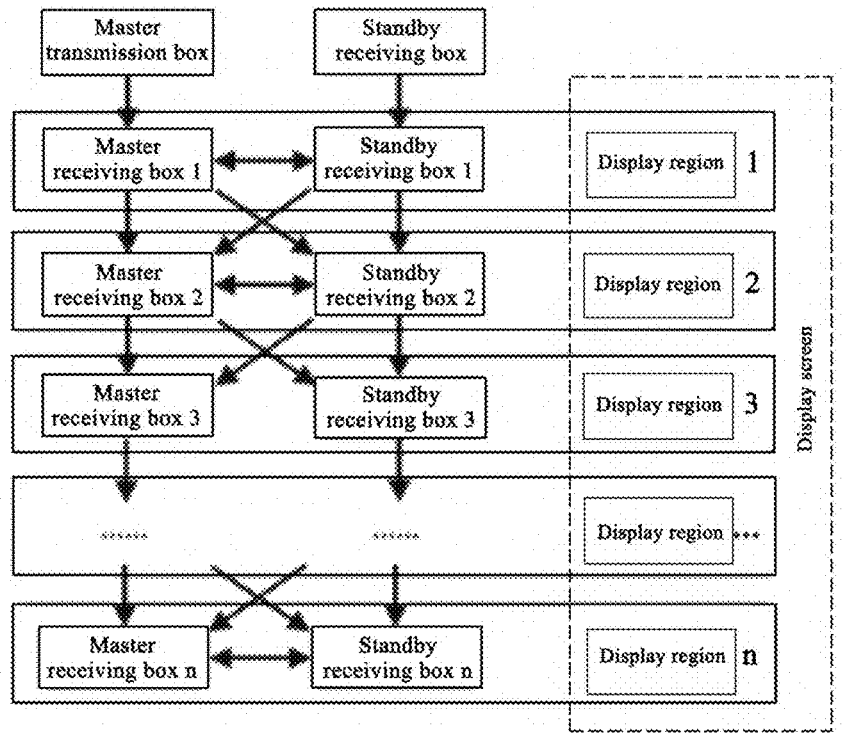
FIG. 2 is a schematic view showing an interior architecture of a stage art structure.

In some embodiments, referring to FIG. 2 which shows an interior architecture of a stage art structure, the stage art structure 224 includes n master receiving boxes, n standby receiving boxes and a display screen, wherein n is an integer greater than 1. The n master receiving boxes are sequentially coupled in series, and a first master receiving box is coupled to the master transmission box. The n standby receiving boxes are sequentially coupled in series, and a first standby receiving box is coupled to the standby transmission box. The $i^{th}$ master receiving box is coupled to the $i^{th}$ standby receiving box. The $i^{th}$ master receiving box is coupled to the $(i+1)^{th}$ standby receiving box. The $i^{th}$ standby receiving box is coupled to the $(i+1)^{th}$ master receiving box, wherein i=1, 2, 3 . . . n, and i is an integer. The n master receiving boxes and the n standby receiving boxes each are coupled to the display screen. The display screen has n display regions. The $i^{th}$ master receiving box and the $i^{th}$ standby receiving box may control the $i^{th}$ display region of the display screen to display.

Figure 3:
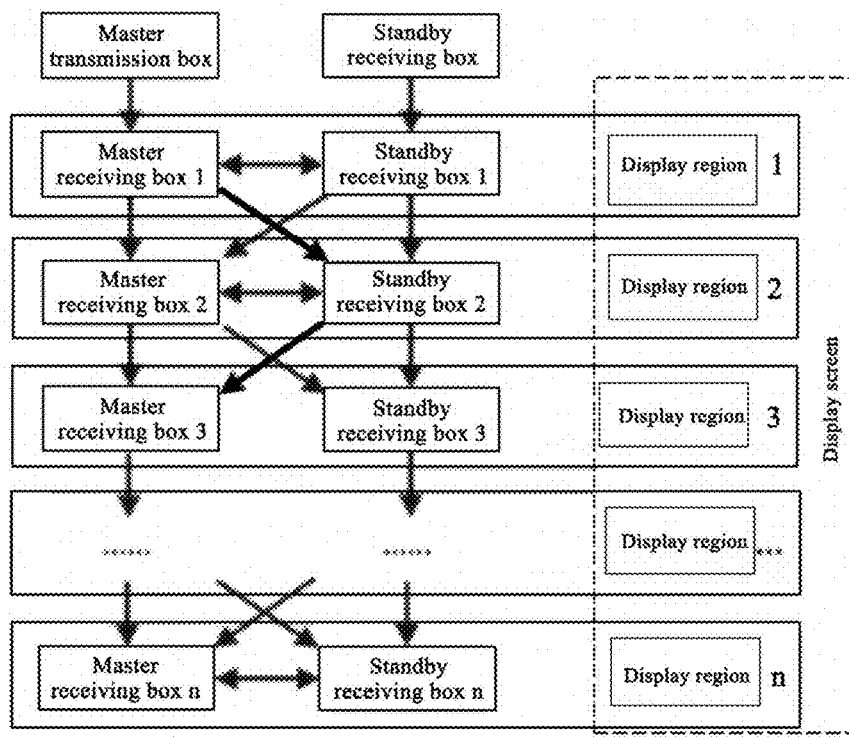
FIG. 3 is a schematic diagram of receiving and transmitting audio or video signal by a corresponding standby receiving box when a master receiving box is abnormal.

The display screen may be a mini LED display screen or an OLED display screen. The stage art structure 224 includes a plurality of master receiving boxes and a plurality of standby receiving boxes in parallel. One of the master receiving boxes and corresponding one of the standby receiving boxes control one corresponding of the display regions to display, namely, every two receiving boxes control one display region to display. When the $i^{th}$ master receiving box breaks down, the $i^{th}$ standby receiving box replaces the $i^{th}$ master receiving box to receive and transmit the audio/video file. In this way, the scheme of master-standby+ring-backup receiver boxes of the stage art structure can be realized, which further improves the robustness of the broadcast control system. FIG. 3 is a schematic diagram of receiving and transmitting the audio/video file by a standby receiving box when a corresponding master receiving box fails.

In some embodiments, the stage art structure may alternatively include n display screens, and the n master receiving boxes and the n standby receiving boxes are respectively coupled to the n display screens in a one-to-one correspondence. The $i^{th}$ master receiving box and the $i^{th}$ standby receiving box may control the $i^{th}$ display screen to display. In some embodiments, n display screens may be spliced to form one large screen for displaying an entire video image; or the n display screens may display various video images each of which is an entire video image. In some embodiments, the n display screens may alternatively be respectively located at different spatial positions, and the n display screens may display various video images each of which is an entire video image.

In some embodiments, referring to FIG. 1, the broadcast major structure 2 further includes a second master control device 26, a first wireless network transmission circuit 27, a second wireless network transmission circuit 28, a fifth serial server 29, and a sixth serial server 30. The first wireless network transmission circuit 27 is coupled to the fifth serial server 29. The fifth serial server 29 is coupled to the third network transmission circuit 21. The second wireless network transmission circuit 28 is coupled to the sixth serial server 30. The sixth serial server 30 is coupled to the fourth network transmission circuit 24. The second master control device 26 may transmit a wireless audio/video broadcast control signal. The first wireless network transmission circuit 27 and the second wireless network transmission circuit 28 each receive the wireless audio/video broadcast control signal, and transmit the wireless audio/video broadcast control signal to the fifth serial server 29 and the sixth serial server 30 respectively. The fifth serial server 29 may convert the audio/video broadcast control signal from an RS485/RS232 signal into a TCP/IP protocol text. The sixth serial server 30 may convert the audio/video broadcast control signal from the RS485/RS232 signal into the TCP/IP protocol text.

The frequency range of the wireless signal transmitted is in a range from 30 MHz to 500 MHz. The first wireless network transmission circuit 27 is coupled to the fifth serial server 29 through a twisted pair cable. The second wireless network transmission circuit 28 is coupled to the sixth serial server 30 through a twisted pair cable. The fifth serial server 29 is coupled to the third network transmission circuit 21 through a network cable. The sixth serial server 30 is coupled to the fourth network transmission circuit 24 through a network cable.

In the embodiment, if a transmission route in the studio control room 1 fails, for example, if both of the master transmission route 101 and the standby transmission route 102 break off, the second master control device 26 in the broadcast major structure 2 may transmit a wireless audio/video broadcast control signal, so as to control the master broadcast control route 201 and the standby broadcast control route 202 in the broadcast major structure 2 to play the audio/video file. The broadcast major structure 2 with the wireless and wired communication modes can remedy the broadcast control system in a case where the studio control room 1 ceases to operate, so that the audio or video plays normally in a case where the studio control room 1 ceases to operate, thereby further improving the robustness of the broadcast control system.

In some embodiments, the first wireless network transmission circuit 27 and the second wireless network transmission circuit 28 each employ switches or routers. For example, the first wireless network transmission circuit 27 and the second wireless network transmission circuit 28 may be wireless access points (i.e., wireless APs), which are used for wireless switches of a wireless network and are also cores of the wireless network. A wireless AP is an access point for a user of a mobile computer accessing a wired network.

In some embodiments, the second master control device 26 may be any terminal capable of wireless signal transmission, such as a tablet computer, a PC, or the like.

In the broadcast control system provided in the embodiment of the present disclosure, the configuration of the master transmission route 101 and the standby transmission route 102 implements a master-standby backup scheme for the studio control room 1, that is, the same audio/video broadcast control signal is transmitted to the broadcast major structure 2 through two independent circuit, thereby ensuring effective transmission of the audio/video broadcast control signals and further ensuring robustness of the broadcast control system. By providing the master broadcast control structure and the standby broadcast control structure in the broadcast major structure 2, the demand of the broadcast control system on the studio control room 1 can be reduced, and the transportability of the broadcast control system can be improved. The first serial server 12 and the second serial server 15 transmit the audio/video broadcast control signal, not only the long-distance transmission of the audio/video broadcast control signal can be ensured, but also the separation in terms of networks between the studio control room 1 and the broadcast major structure 2 can be realized. At the same time, the possibility of the studio control room 1 being interfered by other equipment and the impact of the studio control room 1 on the broadcast major structure 2 can be reduced. By providing the master broadcast control structure, the standby broadcast control structure and the audio/video switcher 222 in the broadcast major structure 2, when one of the master broadcast controller 220 and the standby broadcast controller 250 fails, the audio/video switcher 222 switches to the other one which does not fail to provide the audio/video file, thereby further improving the robustness of the broadcast control system. The stage art structure employs the scheme of master-standby+ring-backup receiver boxes, thereby further improving the robustness of the broadcast control system. The broadcast major structure 2 with the wireless and wired communication modes can remedy the broadcast control system in a case where the studio control room 1 ceases to operate, so that the audio or video plays normally in a case where the studio control room 1 ceases to operate, thereby further improving the robustness of the broadcast control system.

Figure 4:
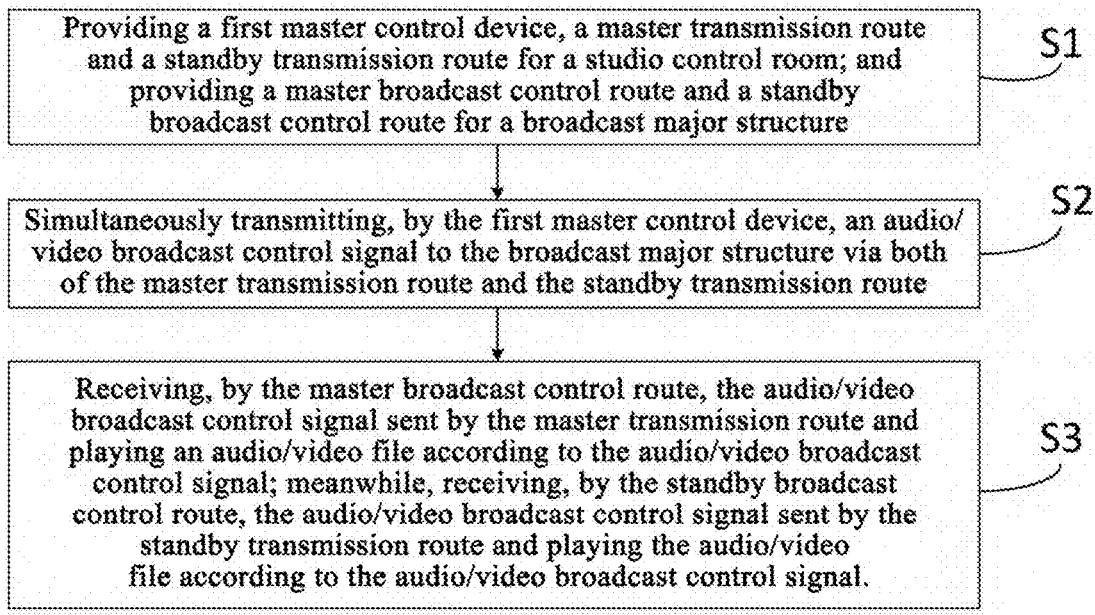
FIG. 4 is a flowchart of a broadcast control method according to an embodiment of the present disclosure.

As a fourth aspect, based on the foregoing broadcast control system provided in the embodiment of the present disclosure, an embodiment of the present disclosure further provides a broadcast control method. FIG. 4 is a flowchart of the broadcast control method in the embodiment of the present disclosure.

The broadcast control method includes step S1 to step S3.

At step S1, a first master control device, a master transmission route and a standby transmission route are provided in a studio control room; and a master broadcast control route and a standby broadcast control route are provided in the broadcast major structure.

At step S2, the first master control device transmits an audio/video broadcast control signal (i.e., a same audio/video broadcast control signal) to the broadcast major structure through both of the master transmission route and the standby transmission route at the same time.

At step S3, the master broadcast control route receives the audio/video broadcast control signal sent by the master transmission route and plays the audio/video file according to the audio/video broadcast control signal. Meanwhile, the standby broadcast control route receives the audio/video broadcast control signal sent by the standby transmission route and plays the audio/video file according to the audio/video broadcast control signal.

According to the broadcast control method, the configuration of the master transmission route and the standby transmission route can realize a master-standby backup scheme of the studio control room, namely, the audio/video broadcast control signal is transmitted to the broadcast major structure via two independent circuits, so that the effective transmission of the audio/video broadcast control signal can be ensured, and the robustness of the broadcast control system can be further ensured. The studio control room only needs to transmit an audio/video broadcast control signal, so that the hardware requirement on the studio control room can be reduced, and the applicability of the studio control room is wider. The master broadcast control route and the standby broadcast control route simultaneously receive the audio/video broadcast control signal and simultaneously play the audio/video file according to the audio/video broadcast control signal, which facilitates the synchronization of the audio or video signal during the subsequent switching of the master broadcast control route and the standby broadcast control route.

In some embodiments, the broadcast control method further includes determining whether a feedback signal returned from the master broadcast control route and/or the standby broadcast control route is received or not during a second predetermined time, after the first master control device transmits the audio/video broadcast control signal to the broadcast major structure. The task of the first master control device is finished, in response to that the first master control device receives the feedback signal returned from the master broadcast control route and/or the standby broadcast control route during the second predetermined time. The first master control device transmits the audio/video broadcast control signal again, in response to the first master control device does not receive the feedback signal returned from the master broadcast control route and/or the standby broadcast control route during the second predetermined time.

Referring to table 1, the protocol text of the audio/video broadcast control signal sent from the first master control device to the broadcast major structure and the protocol text of the feedback signal returned to the first master control device from the master broadcast control route and/or the standby broadcast control route are shown.

| Studio control room → Broadcast major structure | | | | |
|---|---|---|---|---|
| Function description | Packet header | Function code | Command word | Check code |
| Play | 55 AA | 00 01 | 00 00 | C6 45 |
| Pause | | 00 02 | | 07 C4 |
| Stop | | 00 03 | | C7 05 |
| Replay | | 00 04 | | 05 44 |
| Program 1 | | 00 05 | | C5 85 |
| ... | | ... | | ... |
| Program n | | FF FF | | 76 44 |

| Broadcast major structure → Studio control room | | | | |
|---|---|---|---|---|
| Function description | Packet header | Function code | Command word | Check code |
| Play | 55 AA | 00 01 | FF FF | E2 D5 |
| Pause | | 00 02 | | E3 95 |
| Stop | | 00 03 | | 23 54 |
| Replay | | 00 04 | | E1 15 |
| Program 1 | | 00 05 | | 21 D4 |
| ... | | ... | | ... |
| Program n | | FF FF | | 92 15 |

As can be seen from table 1, the protocol texts of the audio/video broadcast control signal and the feedback signal each include a function description, a packet header, a function code, a command word, and a check code. The protocol text is simple and has a check code, so that it may be accurately verified whether the communication between the studio control room and the broadcast major structure is successful or not.

In some embodiments, the broadcast control method further includes: playing the audio/video file according to the audio/video broadcast control signal received for the first time, when (both of) the master broadcast control route and the standby broadcast control route receive the audio/video broadcast control signal for multiple times during a third predetermined time. Therefore, the impact on the broadcast major structure caused by the wrong signal sent by the studio control room can be prevented.

Figure 5:
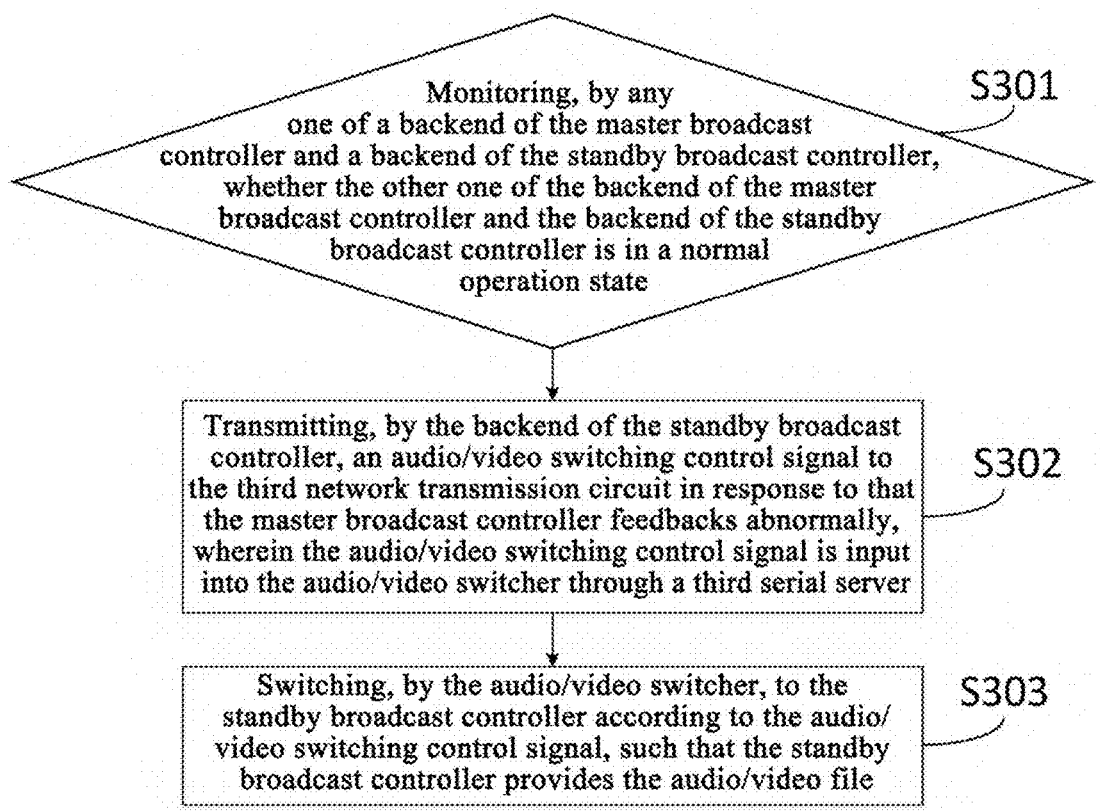
FIG. 5 is a flowchart of switching an audio or video signal through an audio/video switcher when one of a master broadcast controller and a standby broadcast controller is abnormal in an embodiment of the present disclosure.

In some embodiments, FIG. 5 is a flowchart of switching the audio or video by an audio/video switcher when one of a master broadcast controller and a standby broadcast controller is abnormal in an embodiment of the present disclosure. The broadcast control method includes step S301 to step S303. At step S301, the backend of the master broadcast controller and the backend of the standby broadcast controller monitor each other to determine where the other side is in a normal operation state.

At step S302, the backend of the standby broadcast controller transmits an audio/video switching control signal to a third network transmission circuit, in response to the master broadcast controller feedbacks abnormally. The audio/video switching control signal is input into the audio/video switcher through the third serial server.

At step S303, the audio/video switcher switches to the standby broadcast controller according to the audio/video switching control signal so that the standby broadcast controller provides the audio/video file.

With steps S301 to S303, the broadcast control method improves the robustness of the broadcast control system.

In some embodiments, the master and the standby broadcast controllers operate in the same IP network segment. Therefore, the master broadcast controller and the standby broadcast controller can be smoothly switched.

Figure 6:
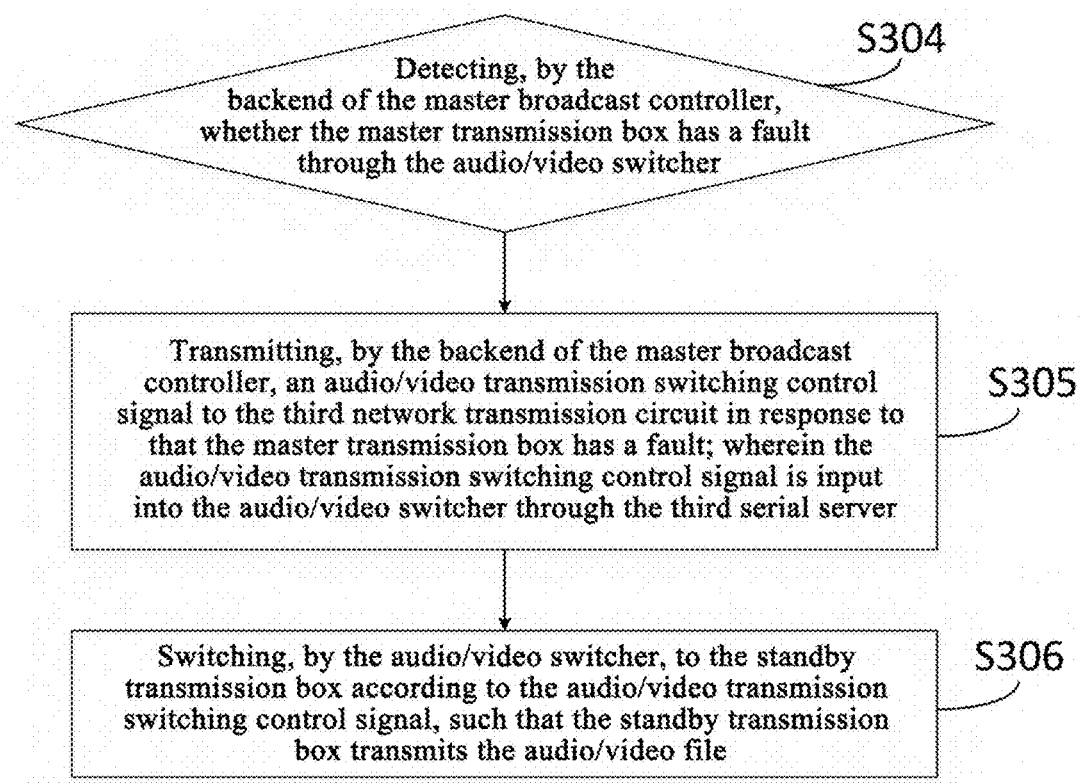
FIG. 6 is a flowchart showing switching to a standby transmission box from a master transmission box by an audio/video switcher when the master transmission box is abnormal in an embodiment of the present disclosure.

In some embodiments, FIG. 6 is a flowchart of switching, by an audio/video switcher, to a standby transmission box for transmission in response to that the master transmission box fails in an embodiment of the present disclosure. The broadcast control method further includes step S304 to step S306. At step S304, the backend of the master broadcast controller detects whether the master transmission box fails via the audio/video switcher.

At step S305, the backend of the master broadcast controller transmits an audio/video transmission switching control signal to the third network transmission circuit, in response to that the master transmission box is in fault. The audio/video transmission switching control signal is input into the audio/video switcher through the third serial server.

At step S306, the audio/video switcher switches to the standby transmission box according to the audio/video transmission switching control signal, so that the standby transmission box transmits the audio/video.

Figure 7:
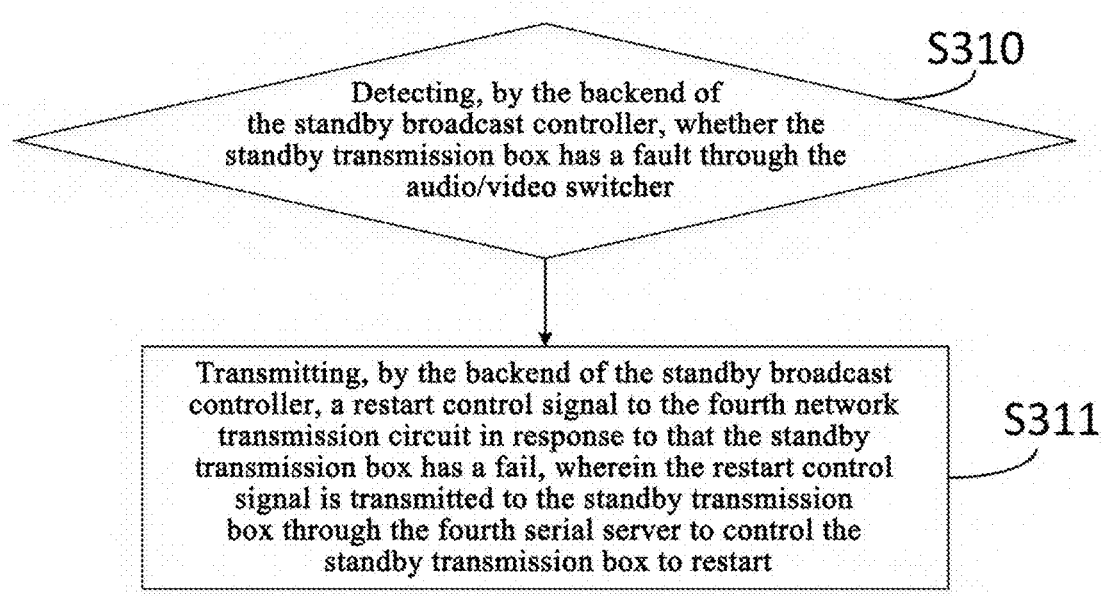
FIG. 7 is a flowchart of restarting a standby transmission box when the standby transmission box is abnormal in an embodiment of the present disclosure.

In some embodiments, FIG. 7 is a flowchart of restarting a standby transmission box in response to that the standby transmission box fails in an embodiment of the present disclosure. The broadcast control method further includes step S310 to step S311. At step S310, the backend of the standby broadcast controller detects whether the standby transmission box has a fault through the audio/video switcher.

At step S311, the backend of the standby broadcast controller transmits a restart control signal to the fourth network transmission circuit, in response to that the standby transmission box has a fault. The restart control signal is transmitted to the standby transmission box through the fourth serial server to control the standby transmission box to restart.

With step S310 to step S311, the standby transmission box can be restarted under the control of the restart control signal in response to the standby transmission box crashes or fails, so that the standby transmission box recovers to be normal; thereby further improving the robustness of the broadcast control system.

In some embodiments, the broadcast control method further includes: detecting, by the master transmission box, whether n master receiving boxes fail or not at intervals of first predetermined time; detecting, by the standby transmission box, whether n standby receiving boxes fail or not at intervals of the first predetermined time. The $i^{th}$ standby receiving box transmits the audio/video file in response to that the $i^{th}$ master receiving box fails. Therefore, the scheme of the master-standby and ring-backup receiving boxes of the stage art structure can be realized, and the robustness of the broadcast control system performing the broadcast control method can be further improved.

Figure 8:
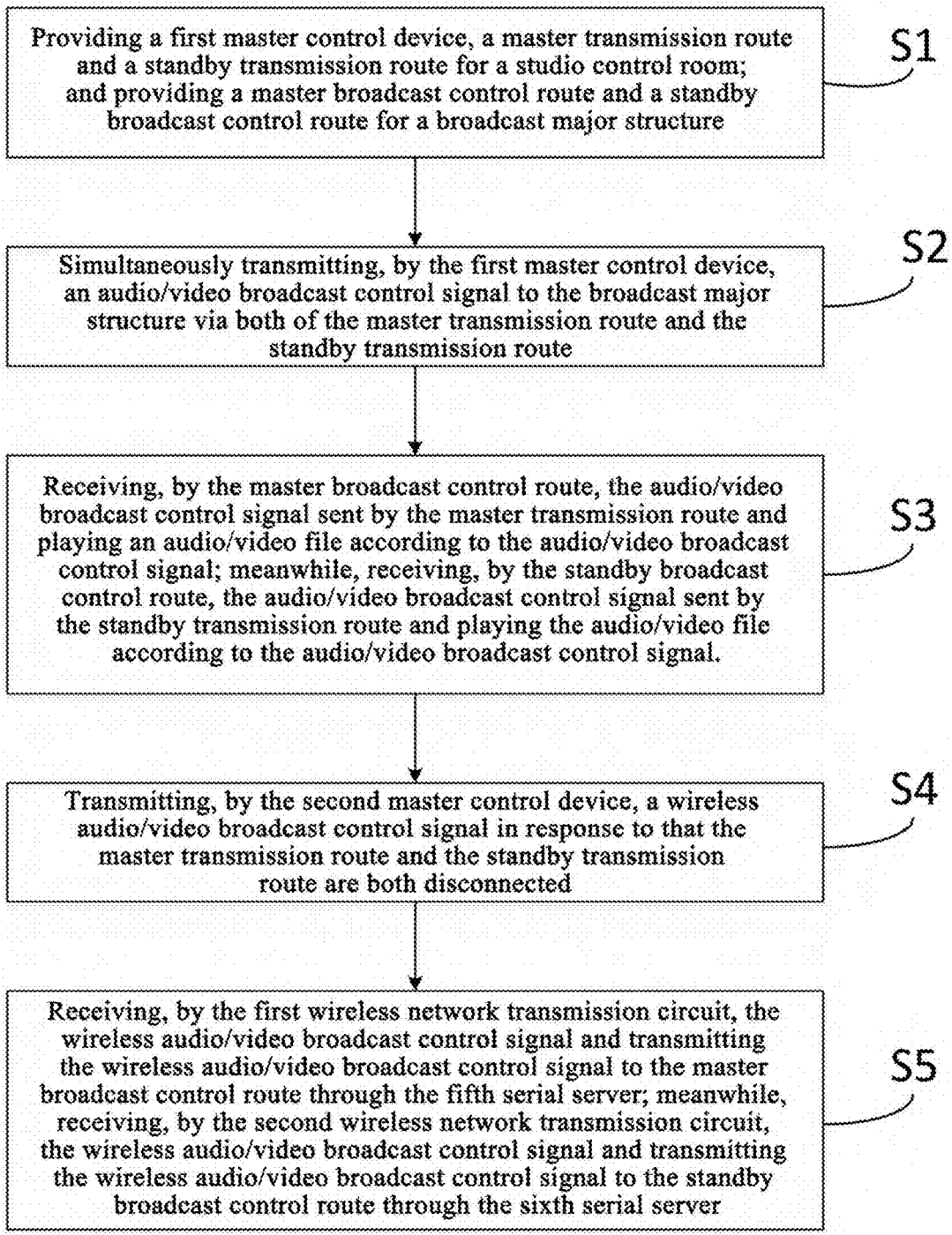
FIG. 8 is a flowchart of another broadcast control method according to an embodiment of the present disclosure.

In some embodiments, FIG. 8 is a flowchart of another broadcast control method in an embodiment of the present disclosure. In addition to the steps in the broadcast control method in FIG. 4, the broadcast control method in FIG. 8 further includes step S4 and step S5. At step S4, the second master control device transmits a wireless audio/video broadcast control signal in response to that both of the master transmission route and the standby transmission route break off.

At step S5, the first wireless network transmission circuit receives the wireless audio/video broadcast control signal and transmits the wireless audio/video broadcast control signal to the master broadcast control route through a fifth serial server. Meanwhile, the second wireless network transmission circuit receives the wireless audio/video broadcast control signal and transmits the wireless audio/video broadcast control signal to the standby broadcast control route through the sixth serial server.

With the addition of step S4 to step S5 on the basis of the broadcast control method in FIG. 4, the broadcast control method can remedy the broadcast control system when the studio control room ceases to operate, so that the audio or video plays normally when the studio control room ceases to operate, thereby further improving the robustness of the broadcast control system performing the broadcast control method.

In some embodiments, the broadcast control method further includes determining whether a feedback signal returned from the master broadcast control route and/or the standby broadcast control route is received or not during second predetermined time after the second master control device transmits an audio/video broadcast control signal to the broadcast major structure. The task of the second master control device is finished, in response to that the second master control device receives the feedback signal returned from the master broadcast control route and/or the standby broadcast control route during the second predetermined time. The second master control device transmits the audio/video broadcast control signal again, in response to that the second master control device does not receive the feedback signal returned from the master broadcast control route and/or the standby broadcast control route during the second predetermined time. Therefore, the broadcast control method can accurately verify whether the communication between the studio control room and the broadcast major structure is successful or not.

The protocol texts of the audio/video broadcast control signal and the feedback signal are shown in table 1.

According to the broadcast control method in the embodiment of the present disclosure, the configuration of the master transmission route and the standby transmission route realizes a master-standby backup scheme of the studio control room, that is, the audio/video broadcast control signal is transmitted to the broadcast major structure through two independent circuit, so that the effective transmission of the audio/video broadcast control signal can be ensured, and the robustness of the broadcast control system can be further ensured. The studio control room only needs to transmit audio/video broadcast control signal, so that the hardware requirement on the studio control room can be reduced, and the applicability of the studio control room is wider.

As a fifth aspect, an embodiment of the present disclosure further provides a broadcast control device including the broadcast control system in any one of the foregoing embodiments.

According to the broadcast control device, with above broadcast control system, a master-standby backup scheme of broadcast control operation can be realized, so that effective transmission of the audio/video broadcast control signal can be ensured, and the reusability and robustness of the broadcast control device can be further ensured.

As a sixth aspect, an embodiment of the present disclosure further provides a non-transitory computer-readable storage medium storing instructions which, when executed by a processor, cause the processor to perform the broadcast control method as described above.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and essence of the present disclosure, and these changes and modifications are to be considered within the scope of the present disclosure.

What is claimed is:

1. A broadcast major structure comprising a master broadcast control route and a standby broadcast control route; wherein each of the master broadcast control route and the standby broadcast control route is configured to receive an audio/video broadcast control signal sent from a studio control terminal and play an audio/video file according to the audio/video broadcast control signal, wherein the master broadcast control route comprises a first optical fiber receiving box, a third network transmission circuit, and a master broadcast control structure sequentially coupled in series, the first optical fiber receiving box is coupled to the studio control terminal and configured to receive the audio/video broadcast control signal and sequentially transmit the audio/video broadcast control signal to the third network transmission circuit and the master broadcast control structure, the master broadcast control structure is configured to play the audio/video file under the control of the audio/video broadcast control signal, the master broadcast control structure comprises a master broadcast controller, a third serial server, an audio/video switcher, a master transmission box and a stage art structure, the master broadcast controller, the audio/video switcher, the master transmission box and the stage art structure are sequentially coupled in series, the third serial server is coupled to the third network transmission circuit and the audio/video switcher, and is configured to convert a signal in form of TCP/IP protocol text output by the third network transmission circuit into an RS485/RS232 signal and provide the RS485/RS232 signal to the audio/video switcher, with the signal in form of TCP/IP protocol text output by the third network transmission circuit comprising the audio/video broadcast control signal, the master broadcast controller is coupled to the third network transmission circuit and is configured to store and provide the audio/video file, and the stage art structure is configured to play the audio/video file provided by the master broadcast controller.

2. The broadcast major structure of claim 1, wherein the standby broadcast control route comprises a second optical fiber receiving box, a fourth network transmission circuit, and a standby broadcast control structure sequentially coupled in series, the second optical fiber receiving box is coupled to the studio control terminal and configured to receive the audio/video broadcast control signal and sequentially transmit the audio/video broadcast control signal to the fourth network transmission circuit and the standby broadcast control structure, and the standby broadcast control structure is configured to play the audio/video file under the control of the audio/video broadcast control signal.

3. The broadcast major structure of claim 2, wherein the standby broadcast control structure comprises a standby broadcast controller, the audio/video switcher, a standby transmission box and the stage art structure,
the standby broadcast controller, the audio/video switcher, the standby transmission box and the stage art structure are sequentially coupled in series,
the standby broadcast controller is coupled to the fourth network transmission circuit and configured to store and provide the audio/video file,
the stage art structure is further configured to play the audio/video file provided by the standby broadcast controller, and
the audio/video switcher is configured to switch to one of the master broadcast controller and the standby broadcast controller in response to the other one of the master broadcast controller and the standby broadcast controller fails, such that the one, which does not fail, of the master broadcast controller and the standby broadcast controller provides the audio/video file.

4. The broadcast major structure of claim 3, wherein the standby broadcast control structure further comprises a fourth serial server,
the fourth serial server is coupled to the fourth network transmission circuit and the standby transmission box, and is configured to convert a signal in form of TCP/IP protocol text output by the fourth network transmission circuit into an RS485/RS232 signal and provide the RS485/RS232 signal to the standby transmission box, and
the signal in form of TCP/IP protocol text output by the fourth network transmission circuit comprises a restart control signal for controlling the standby transmission box to restart.

5. The broadcast major structure of claim 3, wherein the third network transmission circuit is coupled to the fourth network transmission circuit, such that any one of a backend of the master broadcast controller and a backend of the standby broadcast controller monitors whether the other one is in a normal operation state, and
the signal in form of TCP/IP protocol text output to the third serial server from the third network transmission circuit further comprises an audio/video switching control signal, based on which the audio/video switcher switches between the audio/video file provided by the master broadcast controller and the audio/video file provided by the standby broadcast controller.

6. The broadcast major structure of claim 3, wherein the stage art structure comprises n master receiving boxes, n standby receiving boxes and a display screen; wherein n is an integer greater than 1,
the n master receiving boxes are sequentially coupled in series, and a first master receiving box of the n master receiving boxes is coupled to the master transmission box,
the n standby receiving boxes are sequentially coupled in series, and a first standby receiving box of the n standby receiving boxes is coupled to the standby transmission box,
an $i^{th}$ master receiving box is coupled to an $i^{th}$ standby receiving box,
the $i^{th}$ master receiving box is coupled to an $(i+1)^{th}$ standby receiving box,
an $i^{th}$ standby receiving box is coupled to an $(i+1)^{th}$ master receiving box, wherein i=1, 2, 3 . . . n, and i is an integer,
the n master receiving boxes and the n standby receiving boxes each are coupled to the display screen, and the display screen has n display regions, and the $i^{th}$ master receiving box and the $i^{th}$ standby receiving box are configured to control an $i^{th}$ display region of the n display regions of the display screen to display.

7. The broadcast major structure of claim 2, further comprising a second master control device, a first wireless network transmission circuit, a second wireless network transmission circuit, a fifth serial server and a sixth serial server,
the first wireless network transmission circuit is coupled to the fifth serial server, and the fifth serial server is coupled to the third network transmission circuit,
the second wireless network transmission circuit is coupled to the sixth serial server, and the sixth serial server is coupled to the fourth network transmission circuit,
the second master control device is configured to transmit a wireless audio/video broadcast control signal,
the first wireless network transmission circuit and the second wireless network transmission circuit each are configured to receive the wireless audio/video broadcast control signal, and transmit the wireless audio/video broadcast control signal to the fifth serial server and the sixth serial server, respectively,
the fifth serial server is configured to convert the audio/video broadcast control signal in form of RS485/RS232 into the audio/video broadcast control signal in form of TCP/IP protocol text, and
the sixth serial server is configured to convert the audio/video broadcast control signal in form of RS485/RS232 into the audio/video broadcast control signal in form of TCP/IP protocol text.

8. A broadcast control system comprising: a studio control terminal and a broadcast major structure coupled with each other, wherein
the studio control terminal comprises: a first master control device, a master transmission route and a standby transmission route; wherein the first master control device is configured to transmit an audio/video broadcast control signal to the broadcast major structure via the master transmission route and the standby transmission route,
the broadcast major structure comprises a master broadcast control route and a standby broadcast control route,
each of the master broadcast control route and the standby broadcast control route is configured to receive the audio/video broadcast control signal sent from the studio control terminal and play an audio/video file according to the audio/video broadcast control signal,
the master broadcast control route comprises a first optical fiber receiving box, a third network transmission circuit, and a master broadcast control structure sequentially coupled in series,
the first optical fiber receiving box is coupled to the studio control terminal and configured to receive the audio/video broadcast control signal and sequentially transmit the audio/video broadcast control signal to the third network transmission circuit and the master broadcast control structure,
the master broadcast control structure is configured to play the audio/video file under the control of the audio/video broadcast control signal,
the master broadcast control structure comprises a master broadcast controller, a third serial server, an audio/video switcher, a master transmission box and a stage art structure, the third serial server is coupled to the third network transmission circuit and the audio/video switcher, and is configured to convert a signal in form of TCP/IP protocol text output by the third network transmission circuit into an RS485/RS232 signal and provide the RS485/RS232 signal to the audio/video switcher, the signal in form of TCP/IP protocol text output by the third network transmission circuit comprises the audio/video broadcast control signal, the master broadcast controller, the audio/video switcher, the master transmission box and the stage art structure are sequentially coupled in series, the master broadcast controller is coupled to the third network transmission circuit and is configured to store and provide the audio/video file, and the stage art structure is configured to play the audio/video file provided by the master broadcast controller.

9. The broadcast control system of claim 8, wherein the studio control terminal comprises a first optical fiber transmission box, a second optical fiber transmission box, a first network transmission circuit, and a second network transmission circuit, the broadcast major structure comprises a first optical fiber receiving box, a second optical fiber receiving box, a third network transmission circuit, a fourth network transmission circuit, a first wireless network transmission circuit, and a second wireless network transmission circuit, the first optical fiber receiving box in the broadcast major structure is coupled to the first optical fiber transmission box in the studio control terminal via an optical fiber cable, and the first optical fiber receiving box is coupled to the third network transmission circuit in the broadcast major structure via a network cable;

the second optical fiber receiving box in the broadcast major structure is coupled to the second optical fiber transmission box in the studio control terminal via an optical fiber cable, and the second optical fiber receiving box is coupled to the fourth network transmission circuit in the broadcast major structure via a network cable.

10. The broadcast control system of claim 9, wherein the first network transmission circuit and the second network transmission circuit in the studio control terminal, the third network transmission circuit, and the fourth network transmission circuit each employ a switcher or a router, and each of the first wireless network transmission circuit and the second wireless network transmission circuit in the broadcast major structure employs a switcher or a router.

11. A broadcast control device comprising the broadcast control system of claim 8.

12. The broadcast control system of claim 8, wherein the master transmission route comprises a first serial server, a first network transmission circuit, and a first optical fiber transmission box, the first master control device, the first serial server, the first network transmission circuit, and the first optical fiber transmission box are sequentially coupled in series, the first serial server is configured to convert the audio/video broadcast control signal in form of RS485/RS232 into the audio/video broadcast control signal in form of TCP/IP protocol text, the first network transmission circuit is configured to transmit the audio/video broadcast control signal in form of TCP/IP protocol text to the first optical fiber transmission box, and the first optical fiber transmission box is configured to transmit the audio/video broadcast control signal in form of TCP/IP protocol text to the broadcast major structure.

13. A broadcast control method, comprising:

providing a studio control terminal comprising a first master control device, a master transmission route and a standby transmission route; and providing a broadcast major structure comprising a master broadcast control route and a standby broadcast control route;

simultaneously transmitting, by the first master control device, an audio/video broadcast control signal to the broadcast major structure via both of the master transmission route and the standby transmission route; and receiving, by the master broadcast control route, the audio/video broadcast control signal sent by the master transmission route and playing an audio/video file according to the audio/video broadcast control signal; meanwhile, receiving, by the standby broadcast control route, the audio/video broadcast control signal sent by the standby transmission route and playing the audio/video file according to the audio/video broadcast control signal, wherein the master broadcast control route comprises a first optical fiber receiving box, a third network transmission circuit, and a master broadcast control structure sequentially coupled in series, and the first optical fiber receiving box is coupled to the studio control terminal, the broadcast control method further comprises: receiving, by the first optical fiber receiving box, the audio/video broadcast control signal and sequentially transmitting the audio/video broadcast control signal to the third network transmission circuit and the master broadcast control structure, and playing, by the master broadcast control structure, the audio/video file under the control of the audio/video broadcast control signal, wherein the master broadcast control structure comprises a master broadcast controller, a third serial server, an audio/video switcher, a master transmission box and a stage art structure, the third serial server is respectively coupled to the third network transmission circuit and the audio/video switcher, the master broadcast controller, the audio/video switcher, the master transmission box and the stage art structure are sequentially coupled in series, and the master broadcast controller is coupled to the third network transmission circuit, the broadcast control method further comprises:

converting, by the third serial server, a signal in form of TCP/IP protocol text output by the third network transmission circuit into an RS485/RS232 signal and providing the RS485/RS232 signal to the audio/video switcher, with the signal in form of TCP/IP protocol text output by the third network transmission circuit comprising the audio/video broadcast control signal, storing and providing, by the master broadcast controller, the audio/video file, and playing, by the stage art structure, the audio/video file provided by the master broadcast controller.

14. A non-transitory computer-readable storage medium storing instructions which, when executed by a processor, cause the processor to perform the broadcast control method of claim 13.

15. The broadcast control system of claim 12 wherein the standby transmission route comprises a second serial server, a second network transmission circuit, and a second optical fiber transmission box, the first master control device, the second serial server, the second network transmission circuit and the second optical fiber transmission box are sequentially coupled in series, the second serial server is configured to convert the audio/video broadcast control signal in form of RS485/RS232 into the audio/video broadcast control signal in form of TCP/IP protocol text, the second network transmission circuit is configured to transmit the audio/video broadcast control signal in form of TCP/IP protocol text to the second optical fiber transmission box, and the second optical fiber transmission box is configured to transmit the audio/video broadcast control signal in form of TCP/IP protocol text to the broadcast major structure.

16. The broadcast control system of claim 15, wherein the first master control device is coupled to the first serial server via a twisted pair cable, and the first master control device is coupled to the second serial server via a twisted pair cable, and the first serial server and the first optical fiber transmission box each are coupled to the first network transmission circuit via network cables, and the second serial server and the second optical fiber transmission box each are coupled to the second network transmission circuit through network cables.

\* \* \* \* \*